US011924372B2

(12) United States Patent
Li et al.

(10) Patent No.: US 11,924,372 B2
(45) Date of Patent: Mar. 5, 2024

(54) CALL PROCESSING METHOD AND DEVICE (71) Applicant: HUAWEI TECHNOLOGIES CO., LTD., Guangdong (CN)

(72) Inventors: Yibing Li, Nanjing (CN); Hongxia Hao, Shenzhen (CN); Liang Lv, Nanjing (CN); Kaichun Liao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 17/516,531

(22) Filed: Nov. 1, 2021

(65) Prior Publication Data
US 2022/0053086 A1 Feb. 17, 2022

Related U.S. Application Data (63) Continuation of application No. PCT/CN2020/074209, filed on Feb. 3, 2020.

(30) Foreign Application Priority Data

Apr. 30, 2019 (CN) .......................... 201910362403.3

(51) Int. Cl.
H04M 1/56 (2006.01)
H04L 65/1016 (2022.01)
(Continued)

(52) U.S. Cl.
CPC .... *H04M 3/42017* (2013.01); *H04L 65/1016* (2013.01); *H04L 65/1083* (2013.01)

(58) Field of Classification Search
CPC ........... H04M 3/42017; H04L 65/1016; H04L 65/1083
See application file for complete search history.

(56) References Cited

U.S. PATENT DOCUMENTS

2005/0117726 A1* 6/2005 DeMent ............ H04M 3/42017
379/373.02
2007/0207782 A1* 9/2007 Tran ..................... H04N 21/485
455/414.1
(Continued)

FOREIGN PATENT DOCUMENTS

CN 1870694 A 11/2006
CN 101179626 A 5/2008
(Continued)

OTHER PUBLICATIONS

3GPP TS 24.183 V15.0.0 (Jun. 2018), 3rd Generation Partnership Project; Technical Specification Group Core Network and Terminals;IP Multimedia Subsystem (IMS) Customized Ringing Signal(CRS);Protocol specification(Release 15), Total 59 Pages.
(Continued)

*Primary Examiner* — Simon King
(74) *Attorney, Agent, or Firm* — James Harrison (57) ABSTRACT The present invention provides a call processing method and a device. The call processing method includes: receiving, by a customized alerting tone server, a call request sent by a calling terminal, and forwarding the call request to a called terminal; receiving a called terminal ringing message, and playing a customized alerting tone audio stream and a customized alerting tone video stream to the calling terminal; receiving a called terminal message indicating that a called user answers a call, and performing call media resource negotiation and customized alerting tone video resource negotiation with the calling terminal; and stopping playing the customized alerting tone audio stream to the calling terminal, and playing the customized alerting tone video stream to the calling terminal. The customized alerting tone continuous playing solution of the present invention enriches user experience and improves network usage.

16 Claims, 7 Drawing Sheets (51) Int. Cl.
*H04L 65/1083* (2022.01)
*H04M 3/42* (2006.01)
*H04M 15/06* (2006.01)

(56) References Cited

U.S. PATENT DOCUMENTS

| | | | | |
|---|---|---|---|---|
| 2007/0286372 | A1* | 12/2007 | DeMent | H04M 15/06 379/142.01 |
| 2007/0291931 | A1* | 12/2007 | DeMent | H04M 3/42017 379/418 |
| 2009/0191852 | A1 | 7/2009 | David et al. | |
| 2009/0303310 | A1* | 12/2009 | Zhang | H04L 65/104 348/14.02 |
| 2010/0166156 | A1* | 7/2010 | Xu | H04M 3/42017 379/87 |
| 2011/0090904 | A1* | 4/2011 | Zhao | H04L 65/1016 370/352 |
| 2012/0035993 | A1* | 2/2012 | Nangia | G06Q 30/02 705/14.4 |
| 2012/0086766 | A1* | 4/2012 | Yang | H04M 15/83 348/E7.078 |
| 2012/0213346 | A1 | 8/2012 | Gao et al. | |

FOREIGN PATENT DOCUMENTS

| | | |
|---|---|---|
| CN | 101252780 A | 8/2008 |
| CN | 101765075 A | 6/2010 |
| CN | 101841787 A | 9/2010 |
| CN | 102131009 A | 7/2011 |
| EP | 2479968 A1 | 7/2012 |
| WO | 2015196751 A1 | 12/2015 |

OTHER PUBLICATIONS

3GPP TR 21.905 V15.1.0 (Dec. 2018)3rd Generation Partnership Project;Technical Specification Group Services and System Aspects;Vocabulary for 3GPP Specifications(Release 15),total 67 pages.
Huawei et al., "Corrections on AS actions for playing CAT media continuely during conversation",3GPP TSG-CT WG1 Meeting #119 C1-195060,Wroclaw (Poland), Aug. 26-30, 2019, Total 7 Pages.
3GPP TS 22.182 V15.0.0 (Jun. 2018)3rd Generation Partnership Project;Technical Specification Group Services and System Aspects;Customized Alerting Tones (CAT) Requirements; Stage 1(Release 15),total 14 pages.
3GPP TS 24.182 V15.0.0 (Mar. 2018)3rd Generation Partnership Project;Technical Specification Group Core Network and Terminals;IP Multimedia Subsystem (IMS) Customized Alerting Tones (CAT);Protocol specification(Release 15), total 156 pages.
3GPP TS 24.628 V15.0.0 (Jun. 2018)3rd Generation Partnership Project; Technical Specification Group Core Network and Terminals;Common Basic Communication procedures using IP Multimedia (IM)Core Network (CN) subsystem; Protocol specification (Release 15), total 60 pages.
J. Rosenberg,"The Session Initiation Protocol (SIP) Update Method",Request for Comments: 3311,Sep. 2002, total 13 pages.
G. Camarillo et al.,"Early Media and Ringing Tone Generation in the Session Initiation Protocol (SIP)",Request for Comments: 3960, Dec. 2004, total 13 pages.
M. Handley et al.,"SDP: Session Description Protocol",Request for Comments: 4566,Jul. 2006, total 49 pages.
J. Hautakorpi et al.,"The Session Description Protocol (SDP) Content Attribute",Request for Comments: 4796,Feb. 2007, total 11 pages.

* cited by examiner

CALL PROCESSING METHOD AND DEVICE

CROSS-REFERENCE TO RELATED APPLICATION

This application is a continuation of International Patent Application No. PCT/CN2020/074209, filed on Feb. 3, 2020, which claims priority to Chinese Patent Application No. 201910362403.3, filed on Apr. 30, 2019. The disclosures of the aforementioned applications are hereby incorporated by reference in their entireties.

TECHNICAL FIELD

The present invention relates to the communications field, and in particular, to a call processing method and a device.

BACKGROUND

With deployment of the $4^{th}$ generation (4G) wireless communications system and introduction of VoLTE (Voice over LTE), a wireless communications system can provide high definition audio and video communications between calling users and called users, and provide customized alerting tone audio and video services.

In a current VoLTE customized alerting tone system, after a user answers a call, playing of a customized alerting tone is stopped, which affects user experience and limits development of a customized alerting tone service.

SUMMARY

Embodiments of the present invention provide a call processing method and a device, to implement a function that a customized alerting tone server continues playing a customized alerting tone video to a calling terminal during an audio call between a calling user and a called user after the called user answers the call. This enriches user experience, improves usage of network capabilities, and facilitates development of services related to customized alerting tones because the customized alerting tone video to a calling terminal may be played during an audio call between a calling user and a called user after the called user answers the call.

According to a first aspect, an embodiment of the present invention provides a call processing method. The call processing method is applied to a customized alerting tone server and includes: receiving a call request sent by a calling terminal, and forwarding the call request to a called terminal; receiving a called terminal ringing message, and playing a customized alerting tone audio stream and a customized alerting tone video stream to the calling terminal; receiving a called terminal message indicating that a called user answers a call, and performing call media resource negotiation and customized alerting tone video resource negotiation with the calling terminal; and stopping playing the customized alerting tone audio stream to the calling terminal, and playing the customized alerting tone video stream to the calling terminal.

In the foregoing method, the customized alerting tone video stream sent by the customized alerting tone server is received while a calling user and a called user are in an audio call, thereby improving user experience and usage of network capabilities.

In a possible design, after the called terminal message indicating that a called user answers a call is received, it is determined that a calling user or a called user has subscribed to a customized alerting tone continuous playing service, and then the call media resource negotiation and customized alerting tone video resource negotiation with the calling terminal is performed.

In another possible design, the performing call media resource negotiation and customized alerting tone video resource negotiation with the calling terminal includes: sending a media negotiation message to the calling terminal. The media negotiation message carries call media resource session description protocol SDP information of the called terminal, and further carries SDP information of the customized alerting tone video stream.

In still another possible design, after receiving the called terminal message indicating that a called user answers a call, the playing the customized alerting tone video stream to the calling terminal includes one of the following manners: The customized alerting tone server continues playing the customized alerting tone video stream that is played during ringing; or the customized alerting tone server re-plays the customized alerting tone video stream that is played during ringing; or the customized alerting tone server plays a customized alerting tone video stream that is different from the customized alerting tone video stream played during ringing.

In still another possible design, the method further includes: receiving a called terminal message indicating that a conversation ends and sent by the called terminal; and performing customized alerting tone media resource negotiation with the calling terminal, and continuing playing a customized alerting tone to the calling terminal.

These possible designs further improve system flexibility.

According to a second aspect, an embodiment of the present invention provides a call processing method. The call processing method is applied to a terminal device and includes: sending a call request; receiving a called terminal ringing message sent by a customized alerting tone server, and a customized alerting tone audio stream and a customized alerting tone video stream that are played by the customized alerting tone server; receiving a called terminal message indicating that a called user answers a call and sent by the customized alerting tone server, and performing call media resource negotiation and customized alerting tone video resource negotiation with the customized alerting tone server; and performing an audio call with a called terminal, and receiving the customized alerting tone video stream played by the customized alerting tone server.

In the foregoing method, the customized alerting tone video stream sent by the customized alerting tone server is received while a calling user and a called user are in an audio call, thereby improving user experience and usage of network capabilities.

In a possible design, the performing call media resource negotiation and customized alerting tone video resource negotiation with the customized alerting tone server includes: receiving a media negotiation message sent by the customized alerting tone server. The media negotiation message carries call media resource session description protocol SDP information of the called terminal, and further carries SDP information of the customized alerting tone video stream.

In still another possible design, the method further includes: after the called terminal ends a conversation, performing customized alerting tone media resource negotiation with the customized alerting tone server, and continuing receiving the customized alerting tone audio stream and the customized alerting tone video stream that are played by the customized alerting tone server.

These possible designs further improve system flexibility.

According to a third aspect, an embodiment of the present invention provides a call processing method. The call processing method is applied to a customized alerting tone server and includes: receiving a call request sent by a calling terminal, and forwarding the call request to a called terminal; receiving a called terminal ringing message, and playing a customized alerting tone audio stream and a customized alerting tone video stream to the calling terminal; receiving a called terminal message indicating that a conversation ends and sent by the called terminal after the called terminal answers a call and a conversation between the calling terminal and the called terminal begins; and performing customized alerting tone media resource negotiation with the calling terminal, and playing the customized alerting tone audio stream and the customized alerting tone video stream to the calling terminal.

In the foregoing method, after an audio and video call between a calling user and a called user, the customized alerting tone video stream sent by the customized alerting tone server is continuously received, thereby improving user experience and usage of network capabilities.

In a possible design, the method further includes: after receiving the called terminal message indicating that a conversation ends, determining that a calling user has subscribed to a customized alerting tone continuous playing service, and then performing customized alerting tone media resource negotiation with the calling terminal.

In still another possible design, the performing customized alerting tone media resource negotiation with the calling terminal includes: sending a media negotiation message to the calling terminal. The media negotiation message carries SDP information of the customized alerting tone audio stream and the customized alerting tone video stream.

In still another possible design, after receiving the called terminal message indicating that a conversation ends, the playing the customized alerting tone audio stream and the customized alerting tone video stream to the calling terminal includes one of the following manners: The customized alerting tone server continues playing the customized alerting tone audio stream and the customized alerting tone video stream that are played during ringing; or the customized alerting tone server re-plays the customized alerting tone audio stream and the customized alerting tone video stream that are played during ringing; or the customized alerting tone server plays a customized alerting tone audio stream and a customized alerting tone video stream that are different from a customized alerting tone during ringing.

According to a fourth aspect, an embodiment of the present invention provides a call processing method. The call processing method is applied to a terminal device and includes: sending a call request; receiving a called terminal ringing message sent by a customized alerting tone server, and a customized alerting tone audio stream and a customized alerting tone video stream that are played by the customized alerting tone server; after a called terminal answers a call, performing a conversation with the called terminal; and after the called terminal ends the conversation, performing customized alerting tone media resource negotiation with the customized alerting tone server, and receiving the customized alerting tone audio stream and the customized alerting tone video stream that are played by the customized alerting tone server.

In the foregoing method, after an audio and video call between a calling user and a called user, the customized alerting tone video stream sent by the customized alerting tone server is continuously received, thereby improving user experience and usage of network capabilities.

In a possible design, the performing customized alerting tone media resource negotiation with the customized alerting tone server includes: receiving a media negotiation message sent by the customized alerting tone server. The media negotiation message carries SDP information of the customized alerting tone audio stream and the customized alerting tone video stream.

These possible designs further improve system flexibility.

According to a fifth aspect, an embodiment of the present invention provides a customized alerting tone server, which has a function of implementing the customized alerting tone server in the foregoing methods. The function may be implemented by hardware, or may be implemented by hardware executing corresponding software. The hardware or software includes one or more units corresponding to the foregoing function, for example, includes a call processing unit, a ringing processing unit, a processing unit after a called user answers a call, and a processing unit after a conversation ends.

In a possible design, a structure of the customized alerting tone server includes a processor and a memory. The memory is configured to store program code executing the foregoing methods, and the processor is configured to execute a program stored in the memory. The customized alerting tone server may further include a communications interface, configured to communicate with another device.

According to a sixth aspect, an embodiment of the present invention provides a terminal device, which has a function of implementing the customized alerting tone server in the foregoing methods. The function may be implemented by hardware, or may be implemented by hardware executing corresponding software. The hardware or software includes one or more units corresponding to the foregoing function, for example, includes a call processing unit, a ringing processing unit, a processing unit after a called user answers a call, and a processing unit after a conversation ends.

In a possible design, a structure of the terminal device includes a processor and a memory. The memory is configured to store program code executing the foregoing methods, and the processor is configured to execute a program stored in the memory. The terminal device may further include a communications interface, configured to communicate with another device.

According to a seventh aspect, an embodiment of the present invention provides a computer storage medium, configured to store computer software instructions used by the foregoing customized alerting tone server and the terminal device. The computer storage medium includes a program designed for executing the foregoing aspects.

Through the foregoing technical solutions provided in the embodiments of the present invention, a function that the customized alerting tone server continues playing a customized alerting tone video to the calling terminal during or after an audio call between the calling user and the called user after the called user answers the call. This enriches user experience, improves usage of network capabilities, and facilitates development of services related to customized alerting tones.

DESCRIPTION OF EMBODIMENTS

To make the objectives, technical solutions, and advantages of the present invention clearer, the following further describes the implementations of the present invention in detail with reference to the accompanying drawings.

In the embodiments of the present invention, after a called user answers a call, a customized alerting tone server may continue playing content of a customized alerting tone video to a calling terminal during a call between a calling user and the called user. Alternatively, after a called user ends a conversation, a customized alerting tone server continues playing content of a customized alerting tone video to a calling terminal. The embodiments of this application are applicable to a 4$^{th}$ generation (4G) mobile communications network architecture, a 5$^{th}$ generation (5G) mobile communications network architecture, or a future network. For ease of descriptions, the following describes a network architecture and a method procedure of the solutions by using the 4G network architecture as an example.

Figure 1:
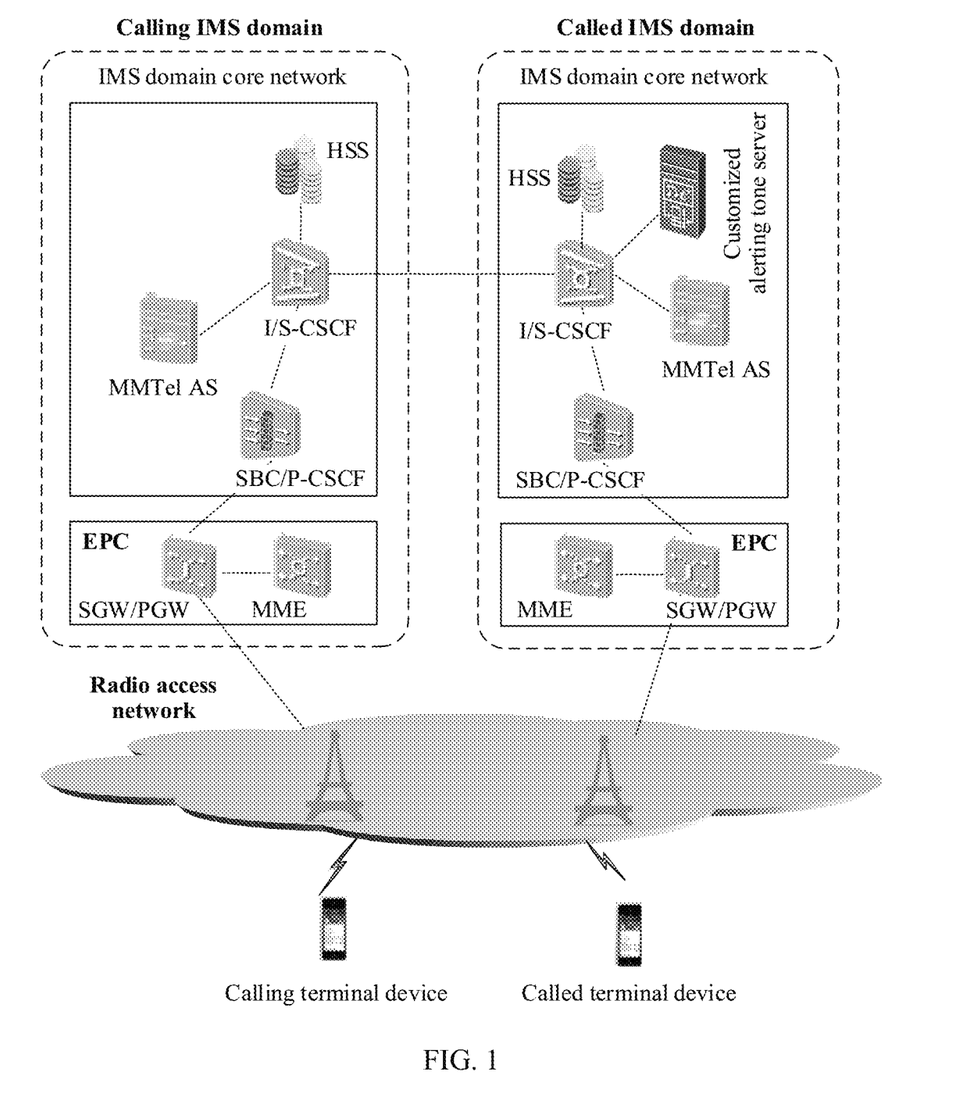
FIG. 1 is a schematic architectural diagram of a call processing system according to an embodiment of the present invention.

FIG. 1 is an architectural diagram of a system applied to a VoLTE network according to an embodiment of the present invention. The system includes: a calling terminal, a called terminal, a radio access network, and Internet Protocol (internet protocol, IP) multimedia subsystem (IP multimedia subsystem, IMS) domain networks on a calling side and a called side.

IMS domains on the calling side and the called side each may include an IMS domain core network and an evolved packet core (Evolved Packet Core, EPC). The IMS domain core network includes a serving-call session control function (serving-call session control function, S-CSCF), an interrogating-call session control function (interrogating-call session control function, I-CSCF), a proxy-call session control function (proxy-call session control function, P-CSCF), a home subscriber server (home subscriber server, HSS), a session border controller (session border controller, SBC), and several dedicated servers such as a multimedia telephony application server (multimedia telephony application server, MMTel AS). The I-CSCF and the S-CSCF may be integrated together, and may be briefly referred to as "I/S-CSCF". The SBC and the P-CSCF may be integrated together, and may be briefly referred to as "SBC/P-CSCF". The EPC may include a packet data network gateway (packet data network gateway, PGW), a serving gateway (serving gateway, SGW), and a mobility management entity (mobility management entity, MME). The P-GW and the S-GW may be integrated together, and may be briefly referred to as "S-GW/P-GW".

The foregoing network elements are all corresponding network elements in a wireless communications network in the conventional technology, are not described in detail herein, and are merely briefly described. For example, the S-CSCF may be used for user registration, authentication control, session routing, service trigger control, and maintenance of session status information. The I-CSCF may be used for assignment and interrogating of an S-CSCF with which a user registers. The P-CSCF may be used for proxy for signaling and messages. The HSS may be configured to store user subscription information and location information. The SBC may provide secure access and media processing. The MMTel AS provides basic and supplementary multimedia telephony services. The MME is a core device on an EPC network. The S-GW may be configured to connect the IMS core network to a wireless network, and the P-GW may be configured to connect the IMS core network to an IP network.

The called IMS domain core network further includes a customized alerting tone (Customized Alerting Tones, CAT) server. The customized alerting tone server provides media play of customized alerting tone audio and a customized alerting tone video for the calling user. The customized alerting tone server and a media resource server MRS can be integrated or separated physically. The customized alerting tone server processes signaling messages, and the media resource server provides customized alerting tone audio and video streams.

The calling terminal and the called terminal each are a device with a wireless transceiver function, and may be deployed on land, including an indoor or outdoor device, a handheld device, or a vehicle-mounted device; may be deployed on water (for example, a steamship); or may be deployed in the air (for example, an airplane, a balloon, or a satellite). Specifically, the terminal device may be a terminal device (terminal device) that can access a mobile network, a mobile phone (mobile phone), a tablet computer (pad), a computer with a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city, a wireless terminal in a smart home, or the like.

It should be noted that the foregoing descriptions do not constitute a limitation on the architectural diagram of the system in the embodiment of the present invention, and the architectural diagram of the system in the embodiment of the present invention includes but is not limited to the system shown in FIG. 1.

Figure 2A:
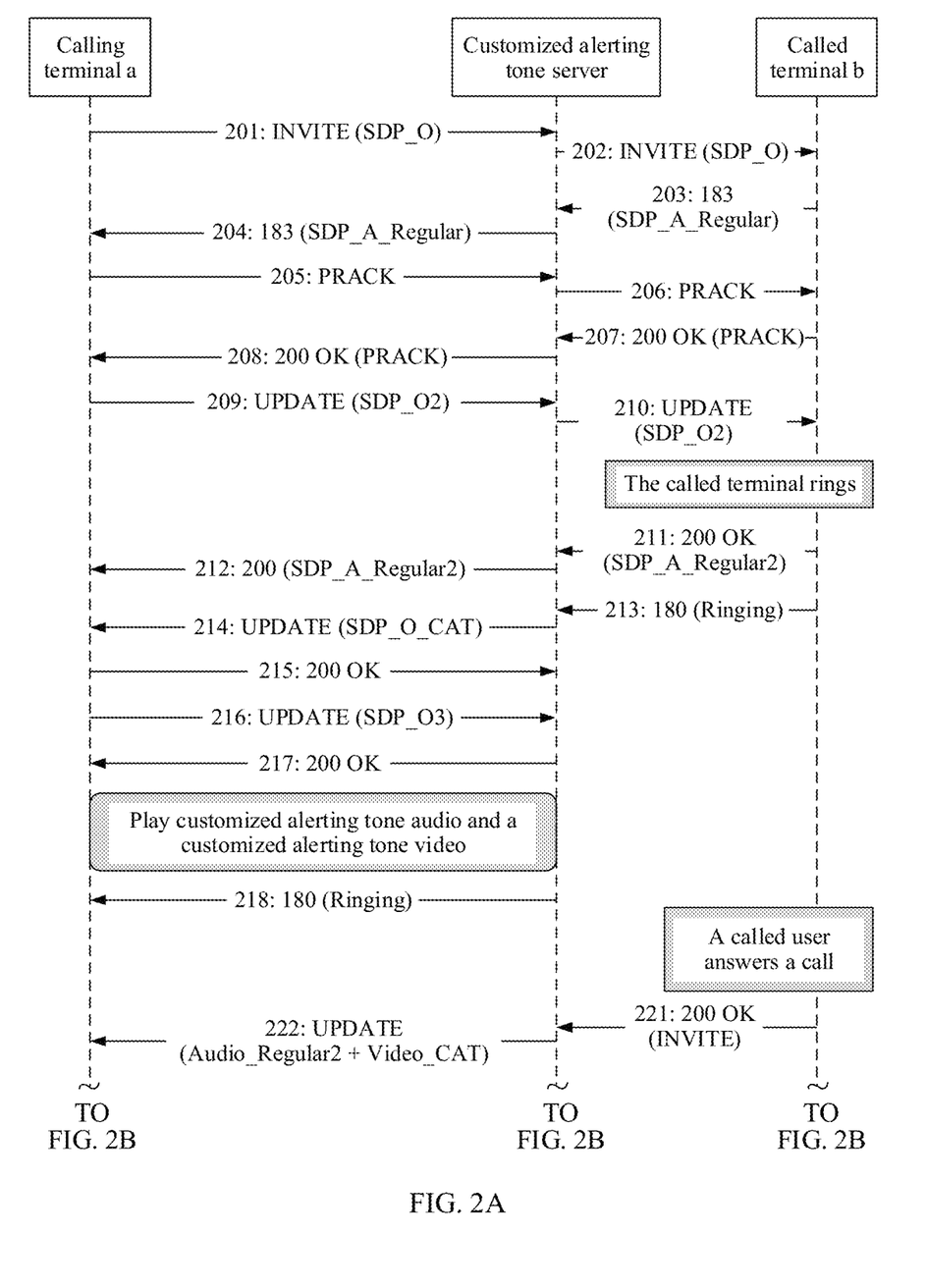
FIG. 2A and FIG. 2B are a schematic flowchart of a call processing method according to an embodiment of the present invention.
Figure 2B:
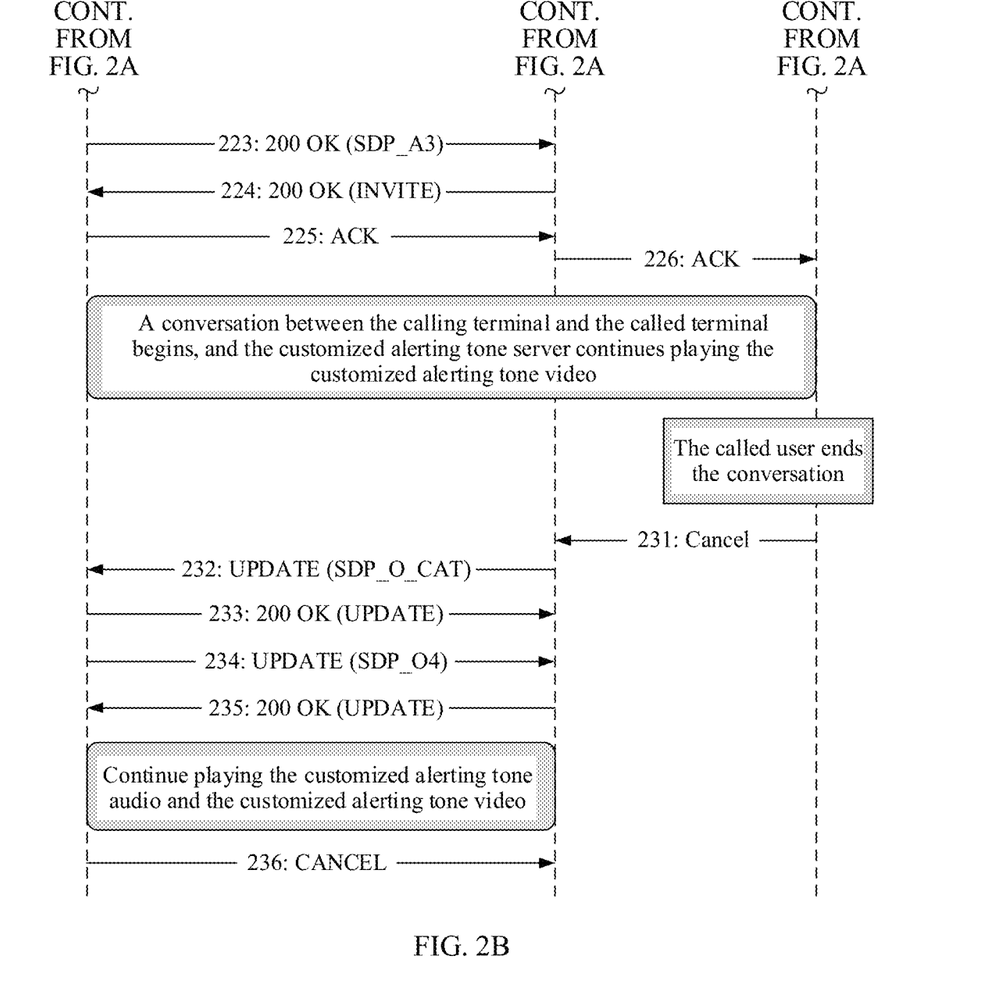

An embodiment of the present invention provides a call processing method that is applied to the system shown in FIG. 1. After a called terminal rings, a customized alerting tone server plays customized alerting tone audio and a customized alerting tone video to a calling terminal. After a called user answers a call, the customized alerting tone server continues sending content of the customized alerting tone video to the calling terminal while a calling user and the called user are in an audio call. Further, after the called terminal ends a conversation, the customized alerting tone server may continue playing the customized alerting tone audio and the customized alerting tone video to the calling terminal. Specific steps are shown in FIG. 2A and FIG. 2B.

To simplify descriptions and facilitate understanding, some network elements such as an S-GW/P-GW, an SBC/P-CSCF, and an I-CSCF/S-CSCF in signaling interaction are not shown in the figure. The method specifically includes the following steps.

201: The customized alerting tone server receives an INVITE message sent by the calling terminal. The calling terminal initiates a voice call to the called terminal by sending an initial INVITE message. A called IMS domain receives the INVITE message. If the called user has subscribed to a customized alerting tone service, a core network device (for example, an S-CSCF) on a called side sends the INVITE message to the customized alerting tone server. The INVITE message carries SDP (Session Description Protocol) information of the calling terminal.

202: The customized alerting tone server forwards the INVITE message to the called terminal, and connects to the called terminal.

203: The customized alerting tone server receives a 183 message from the called terminal. After receiving the INVITE message, the called terminal sends the 183 message to the customized alerting tone server, and starts performing normal media negotiation with the calling terminal. The 183 message carries SDP information of the called terminal.

204: The customized alerting tone server forwards the 183 message to the calling terminal.

205: The customized alerting tone server receives an acknowledgment message PRACK (Provisional Response ACKnowledgement) returned by the calling terminal in response to the 183 message.

206: The customized alerting tone server forwards the PRACK message to the called terminal.

207: The customized alerting tone server receives a 200 OK message returned by the called terminal in response to the PRACK message.

208: The customized alerting tone server forwards the 200 OK message to the calling terminal.

209: The customized alerting tone server receives an UPDATE message sent by the calling terminal. If the calling terminal starts a Precondition procedure, the calling terminal sends the UPDATE message carrying call resource information to the called side after resource reservation is completed.

210: The customized alerting tone server forwards the UPDATE message to the called terminal. After the called terminal receives the UPDATE message, the resource reservation is completed. In this case, the called terminal may start ringing.

211: The customized alerting tone server receives a 200 OK message sent by the called terminal in response to the UPDATE message, where the 200 OK message carries the call resource information of the called terminal.

212: The customized alerting tone server forwards the 200 OK message to the calling terminal.

213: The customized alerting tone server further receives a 180 ringing message sent by the called terminal, indicating that the called terminal starts ringing.

214: After receiving the ringing message, the customized alerting tone server performs customized alerting tone playing resource negotiation with the calling terminal, and sends an UPDATE message to the calling terminal. The UPDATE message carries customized alerting tone audio and video SDP information that includes an IP address of a customized alerting tone MRS.

215: The customized alerting tone server receives a 200 OK message returned by the calling terminal in response to the UPDATE message.

216: The customized alerting tone server receives an UPDATE message sent by the calling terminal. The calling terminal notifies the customized alerting tone server after customized alerting tone audio and video resource reservation is completed.

217: The customized alerting tone server returns, to the calling terminal, a 200 OK message in response to the UPDATE message.

218: The customized alerting tone server starts to play, to the calling terminal, an audio stream and a video stream that include first customized alerting tone content, and forwards a 180 ringing message to the calling terminal to notify the calling terminal that the called terminal rings.

221: The customized alerting tone server receives a message indicating that a called user answers a call, namely, a 200 OK (INVITE) message, sent by the called terminal. The called user answers the call after hearing a ringing tone. The called terminal sends the 200 OK (INVITE) message.

To confirm a latest available call media resource with the called terminal, the customized alerting tone server may further initiate a REINVITE request to the called terminal after receiving the 200 OK (INVITE) message, to obtain a 200 OK response message that carries a call resource SDP information and that is returned by the called terminal.

222: The customized alerting tone server sends an UPDATE message to the calling terminal to perform media resource negotiation with the calling terminal. Through media resource negotiation, the customized alerting tone server continues playing a customized alerting tone video to the calling terminal during a call between the calling terminal and the called terminal.

After receiving the message indicating that a called user answers a call, the customized alerting tone server may query whether the calling user and the called user have subscribed to a customized alerting tone continuous playing service, to determine whether customized alerting tone continuous playing needs to be performed during a call. If either party has subscribed to the customized alerting tone continuous playing service, a customized alerting tone continuous playing process can be started.

The UPDATE message sent by the customized alerting tone server to the calling terminal carries not only the call media resource SDP information, but also the customized alerting tone video stream SDP information. In this case, the customized alerting tone server continues playing the customized alerting tone video to the calling terminal during a call between the calling terminal and the called terminal. The call media resource SDP information includes information such as an IP address of the called terminal, and the customized alerting tone video stream SDP information includes information such as an IP address of the customized alerting tone media resource server MRS.

That a message returned by the called terminal includes the call media resource SDP information includes the following possible cases: (a) The 180 ringing message sent when the called terminal rings carries the call media resource SDP information. (b) The 200 OK (INVITE) message sent when the called user answers the call carries the call media resource SDP information. (c) The 200 OK (REINVITE) message that is returned to the customized alerting tone server again after the called user answers the call and then receives the REINVITE request sent by the customized alerting tone server carries the call media resource SDP information. If a plurality of cases of the foregoing three cases exist in the same call procedure, the SDP information carried in the last message is selected according to the sequence of (a), (b), and (c).

223: The customized alerting tone server receives a 200 OK message returned by the calling terminal in response to the UPDATE message after the resource reservation succeeds.

224: The customized alerting tone server forwards the called message indicating that a called user answers a call, namely, the 200 OK (INVITE) message, to the calling terminal.

225: The customized alerting tone server receives an acknowledgment message, namely, an ACK message, from the calling terminal, to acknowledge receiving of the message indicating that a called user answers a call, namely, the 200 OK (INVITE) message.

226: The customized alerting tone server forwards the received ACK message to the called terminal to set up a call channel between the calling terminal and the called terminal.

After the foregoing steps are completed, a conversation between the calling terminal and the called terminal begins. In this case, the customized alerting tone server stops playing a customized alerting tone audio stream, and continues playing the customized alerting tone video stream to the calling terminal.

The customized alerting tone server may continue playing a video stream including the foregoing first customized alerting tone content to the calling terminal, or may replay from the beginning, the video stream including the first customized alerting tone content to the calling terminal, or may play another different customized alerting tone content, for example, a video stream including second customized alerting tone content.

The calling terminal may process a call screen and a customized alerting tone screen in a plurality of manners. For example, if only audio exists in a call between the calling terminal and the called terminal, the calling terminal may directly display a customized alerting tone video image in a portrait or landscape orientation, and the display form of the customized alerting tone video image is the same as that of the customized alerting tone during ringing. Alternatively, if audio and a video both exist in the call between the calling terminal and the called terminal, a calling terminal screen may display the customized alerting tone video image in a picture-in-picture manner when displaying call audio and video stream images.

231: The customized alerting tone server receives a called terminal message indicating that a conversation ends, namely, a CANCEL message.

232: The customized alerting tone server sends an UPDATE message to the calling terminal to perform media resource negotiation with the calling terminal again. SDP information carried in the message includes media description information of the customized alerting tone audio stream and the customized alerting tone video stream.

233: The customized alerting tone server receives a 200 OK message from the calling terminal in response to the UPDATE message.

234: The customized alerting tone server receives an UPDATE message sent by the calling terminal. The calling terminal notifies the customized alerting tone server after audio and video resource reservation is completed.

235: The customized alerting tone server returns, to the calling terminal, a 200 OK message in response to the UPDATE message.

After completing the media resource negotiation with the calling terminal again, the customized alerting tone server continues sending a customized alerting tone media stream, including a video stream and an audio stream, to the calling terminal.

236: The customized alerting tone server receives a message indicating that a conversation ends from a calling terminal, namely, a CANCEL message, and then the customized alerting tone server stops playing a customized alerting tone.

Based on the embodiment shown in FIG. 2A and FIG. 2B, the function of continuously playing a customized alerting tone video to the calling terminal during an audio call between the calling user and the called user is implemented. This enriches user experience, improves usage of network capabilities, and facilitates development of services related to customized alerting tones.

An embodiment of the present invention provides another call processing method that is applied to the system shown in FIG. 1. After a called terminal rings, a customized alerting tone server plays customized alerting tone audio and a customized alerting tone video to a calling terminal. After a called user answers a call, a calling user and the called user talk with each other.

Figure 3A:
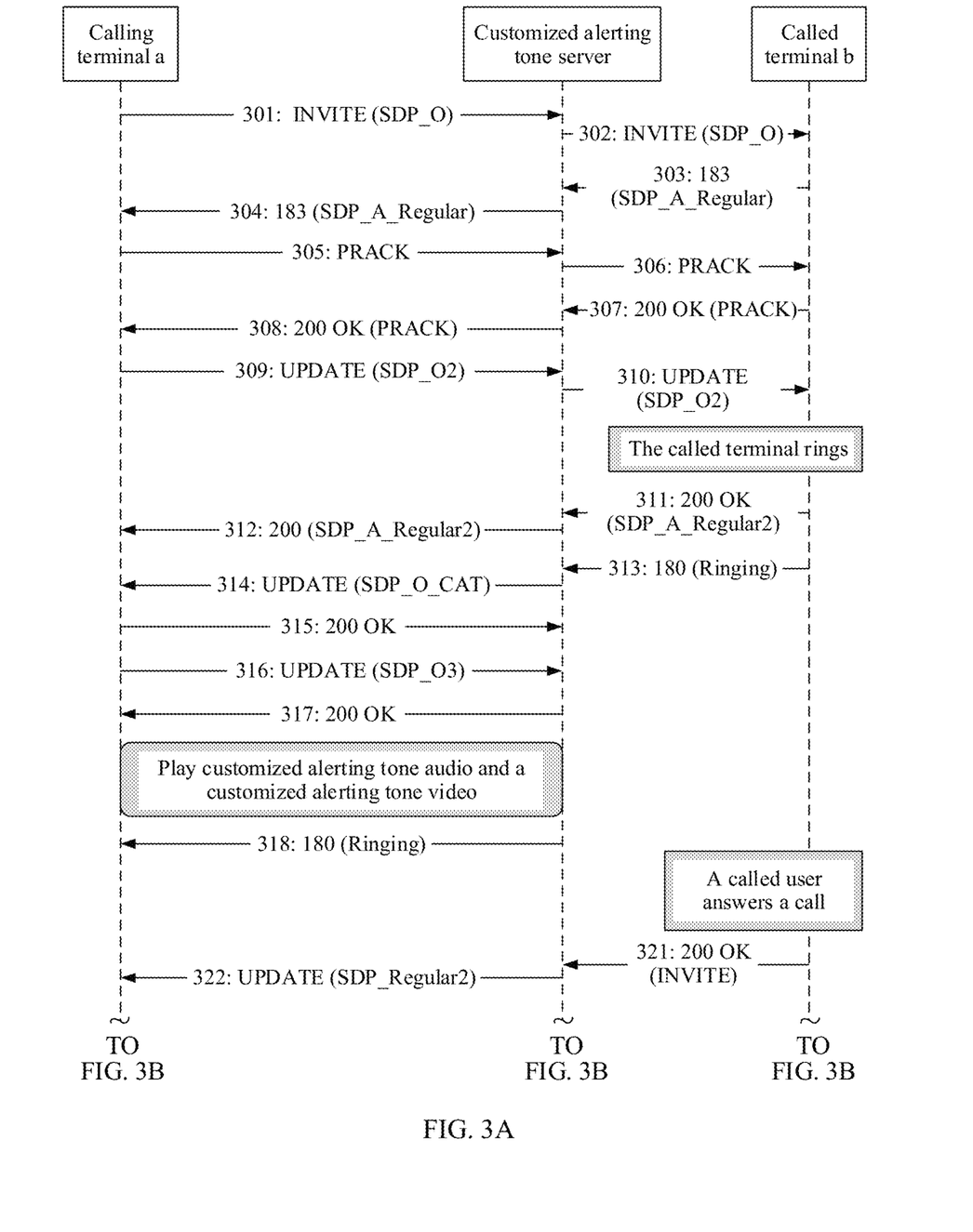
FIG. 3A and FIG. 3B are a schematic flowchart of another call processing method according to an embodiment of the present invention.
Figure 3B:
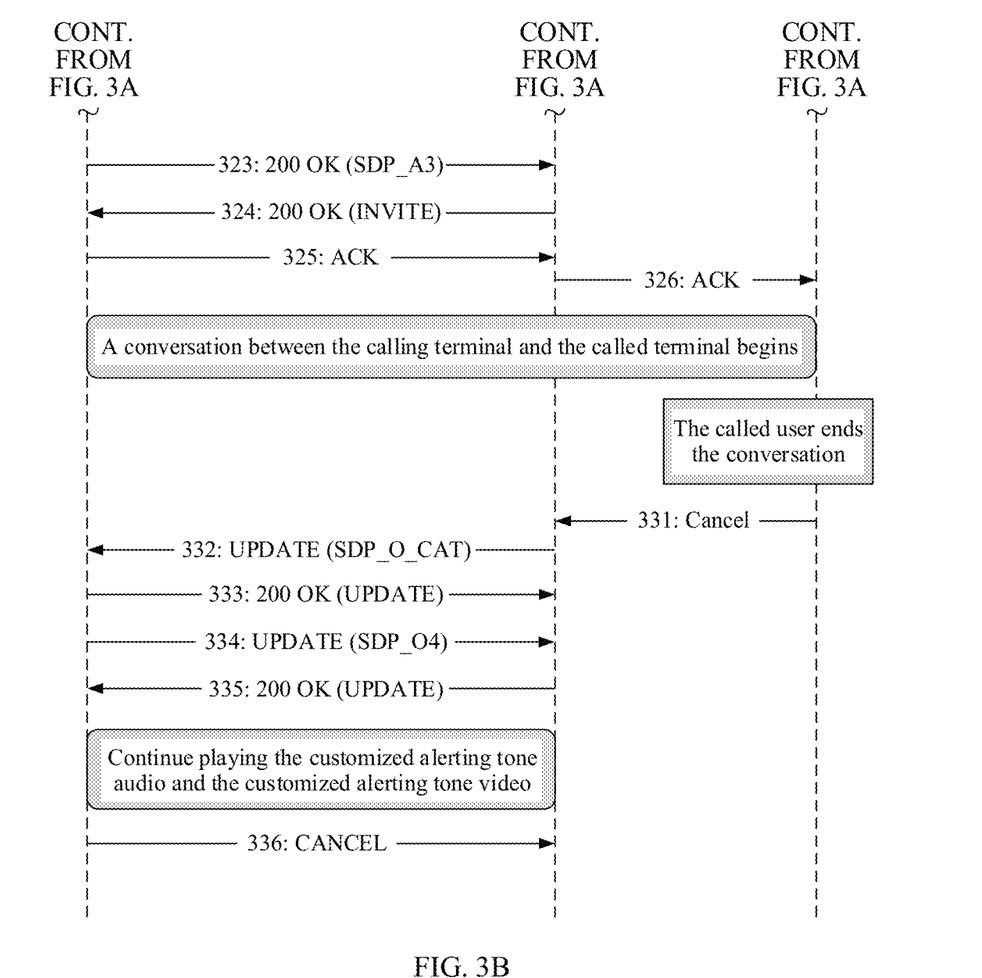

After the called terminal ends a conversation, the customized alerting tone server continues playing the customized alerting tone audio and the customized alerting tone video to the calling terminal. Specific steps are shown in FIG. 3A and FIG. 3B. To simplify descriptions and facilitate understanding, some network elements such as an S-GW/P-GW, an SBC/P-CSCF, and an I-CSCF/S-CSCF in signaling interaction are not shown in the figure. The method specifically includes the following steps.

301: The customized alerting tone server receives an INVITE message sent by the calling terminal. The calling terminal initiates a voice call to the called terminal by sending an initial INVITE message. A called IMS domain receives the INVITE message. If the called user has subscribed to a customized alerting tone service, a core network device (for example, an S-CSCF) on a called side sends the INVITE message to the customized alerting tone server. The INVITE message carries SDP (Session Description Protocol) information of the calling terminal.

302: The customized alerting tone server forwards the INVITE message to the called terminal, and connects to the called terminal.

303: The customized alerting tone server receives a 183 message from the called terminal. After receiving the INVITE message, the called terminal sends the 183 message to the customized alerting tone server, and starts performing normal media negotiation with the calling terminal. The 183 message carries SDP information of the called terminal.

304: The customized alerting tone server forwards the 183 message to the calling terminal.

305: The customized alerting tone server receives an acknowledgment message PRACK (Provisional Response ACKnowledgement) returned by the calling terminal in response to the 183 message.

306: The customized alerting tone server forwards the PRACK message to the called terminal.

307: The customized alerting tone server receives a 200 OK message returned by the called terminal in response to the PRACK message.

308: The customized alerting tone server forwards the 200 OK message to the calling terminal.

309: The customized alerting tone server receives an UPDATE message sent by the calling terminal. If the calling terminal starts a Precondition procedure, the calling terminal sends the UPDATE message carrying call resource information to the called side after resource reservation is completed.

310: The customized alerting tone server forwards the UPDATE message to the called terminal. After the called terminal receives the UPDATE message, the resource reservation is completed. In this case, the called terminal may start ringing.

311: The customized alerting tone server receives a 200 OK message sent by the called terminal in response to the UPDATE message, where the 200 OK message carries the call resource information of the called terminal.

312: The customized alerting tone server forwards the 200 OK message to the calling terminal.

313: The customized alerting tone server further receives a 180 ringing message sent by the called terminal, indicating that the called terminal starts ringing.

314: After receiving the ringing message, the customized alerting tone server performs customized alerting tone playing resource negotiation with the calling terminal, and sends an UPDATE message to the calling terminal. The UPDATE message carries customized alerting tone audio and video SDP information that includes an IP address of a customized alerting tone MRS.

315: The customized alerting tone server receives a 200 OK message returned by the calling terminal in response to the UPDATE message.

316: The customized alerting tone server receives an UPDATE message sent by the calling terminal. The calling terminal notifies the customized alerting tone server after customized alerting tone audio and video resource reservation is completed.

317: The customized alerting tone server returns, to the calling terminal, a 200 OK message in response to the UPDATE message.

318: The customized alerting tone server starts to play, to the calling terminal, an audio stream and a video stream that include first customized alerting tone content, and forwards a 180 ringing message to the calling terminal to notify the calling terminal that the called terminal rings.

321: The customized alerting tone server receives a message indicating that a called user answers a call, namely, a 200 OK (INVITE) message, sent by the called terminal. The called user answers the call after hearing a ringing tone. The called terminal sends the 200 OK (INVITE) message.

To confirm a latest available call media resource with the called terminal, the customized alerting tone server may further initiate a REINVITE request to the called terminal after receiving the 200 OK (INVITE) message, to obtain a 200 OK response message that carries a call resource SDP information and that is returned by the called terminal.

322: The customized alerting tone server sends an UPDATE message to the calling terminal to perform media resource negotiation with the calling terminal. An audio call and/or a video call between the calling terminal and the called terminal is implemented through media resource negotiation.

The UPDATE message sent by the customized alerting tone server to the calling terminal carries call media resource SDP information. The call media resource SDP information includes information such as an IP address of the called terminal.

That a message returned by the called terminal includes the call media resource SDP information includes the following possible cases: (a) The 180 ringing message sent when the called terminal rings carries the call media resource SDP information. (b) The 200 OK (INVITE) message sent when the called user answers the call carries the call media resource SDP information. (c) The 200 OK (REINVITE) message that is returned to the customized alerting tone server again after the called user answers the call and then receives the REINVITE request sent by the customized alerting tone server carries the call media resource SDP information. If a plurality of cases of the foregoing three cases exist in the same call procedure, the SDP information carried in the last message is selected according to the sequence of (a), (b), and (c).

323: The customized alerting tone server receives a 200 OK message returned by the calling terminal in response to the UPDATE message after the resource reservation succeeds.

324: The customized alerting tone server forwards the called message indicating that a called user answers a call, namely, the 200 OK (INVITE) message, to the calling terminal.

325: The customized alerting tone server receives an acknowledgment message, namely, an ACK message, from the calling terminal, to acknowledge receiving of the message indicating that a called user answers a call, namely, the 200 OK (INVITE) message.

326: The customized alerting tone server forwards the received ACK message to the called terminal to set up a call channel between the calling terminal and the called terminal.

After the foregoing steps are completed, a conversation between the calling terminal and the called terminal begins. In this case, the customized alerting tone server stops playing a customized alerting tone.

331: The customized alerting tone server receives a called terminal message indicating that a conversation ends, namely, a CANCEL message.

332: The customized alerting tone server sends an UPDATE message to the calling terminal to perform media resource negotiation with the calling terminal again. SDP information carried in the message includes media description information of the customized alerting tone audio stream and the customized alerting tone video stream.

After receiving the called terminal message indicating that a conversation ends, the customized alerting tone server may query whether the calling user and the called user have subscribed to a customized alerting tone continuous playing service, to determine whether customized alerting tone continuous playing needs to be performed after a call. If either party has subscribed to the customized alerting tone continuous playing service, a customized alerting tone continuous playing process can be started.

333: The customized alerting tone server receives a 200 OK message from the calling terminal in response to the UPDATE message.

334: The customized alerting tone server receives an UPDATE message sent by the calling terminal. The calling terminal notifies the customized alerting tone server after audio and video resource reservation is completed.

335: The customized alerting tone server returns, to the calling terminal, a 200 OK message in response to the UPDATE message.

After completing the media resource negotiation with the calling terminal again, the customized alerting tone server continues sending a customized alerting tone media stream, including a video stream and an audio stream, to the calling terminal.

The customized alerting tone server may continue playing a video stream including the foregoing first customized alerting tone content to the calling terminal, or may replay from the beginning, the video stream including the first customized alerting tone content to the calling terminal, or may play another different customized alerting tone content, for example, a video stream including second customized alerting tone content.

336: The customized alerting tone server receives a message indicating that a conversation ends from a calling terminal, namely, a CANCEL message, and then the customized alerting tone server stops playing a customized alerting tone.

Based on the embodiment shown in FIG. 3A and FIG. 3B, the function of continuously playing a customized alerting tone video to the calling terminal after an audio call between the calling user and the called user is implemented. This enriches user experience, improves usage of network capabilities, and facilitates development of services related to customized alerting tones.

Figure 4:
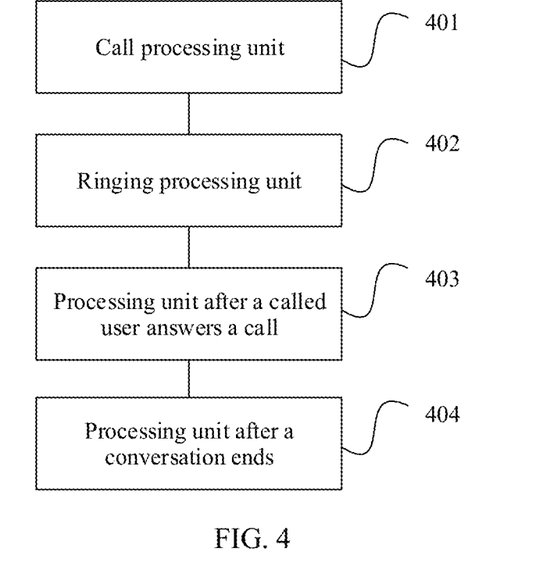
FIG. 4 is a schematic structural diagram of a customized alerting tone server according to an embodiment of the present invention.

An embodiment of the present invention further provides a schematic structural diagram of a customized alerting tone server, as shown in FIG. 4, including a call processing unit 401, a ringing processing unit 402, and a processing unit 403 after a called user answers a call.

The call processing unit is configured to receive a call request sent by a calling terminal, and forward the call request to a called terminal.

The ringing processing unit is configured to receive a called terminal ringing message, and play a customized alerting tone audio stream and a customized alerting tone video stream to the calling terminal.

The processing unit after a called user answers a call is configured to: receive a called terminal message indicating that a called user answers a call, perform call media resource negotiation and customized alerting tone video resource negotiation with the calling terminal, stop playing the customized alerting tone audio stream to the calling terminal, and play the customized alerting tone video stream to the calling terminal.

Further, the customized alerting tone server further includes a processing unit 404 after a conversation ends. The processing unit after a conversation ends is configured to: receive a called terminal message indicating that a conversation ends and sent by the called terminal, perform customized alerting tone media resource negotiation with the calling terminal, and continue playing a customized alerting tone to the calling terminal.

These units implement related functions in the foregoing embodiment in FIG. 2A and FIG. 2B or FIG. 3A and FIG. 3B, and details are not described again.

In this embodiment, the customized alerting tone server is presented in a form of a function unit. The "unit" herein may be an application-specific integrated circuit (application-specific integrated circuit, ASIC), a circuit, a processor and a memory that execute one or more software or firmware programs, an integrated logic circuit, and/or another component that can provide the foregoing functions. In a simple embodiment, a person skilled in the art may figure out that the customized alerting tone server may be implemented by using a processor, a memory, and a communications interface.

Figure 5:
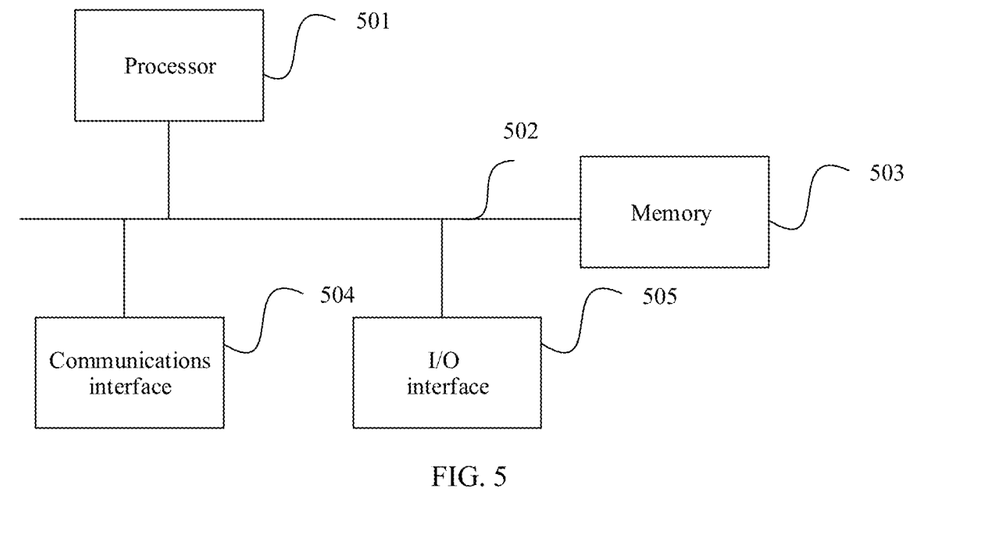
FIG. 5 is a schematic structural diagram of another customized alerting tone server according to an embodiment of the present invention.
Figure 7:
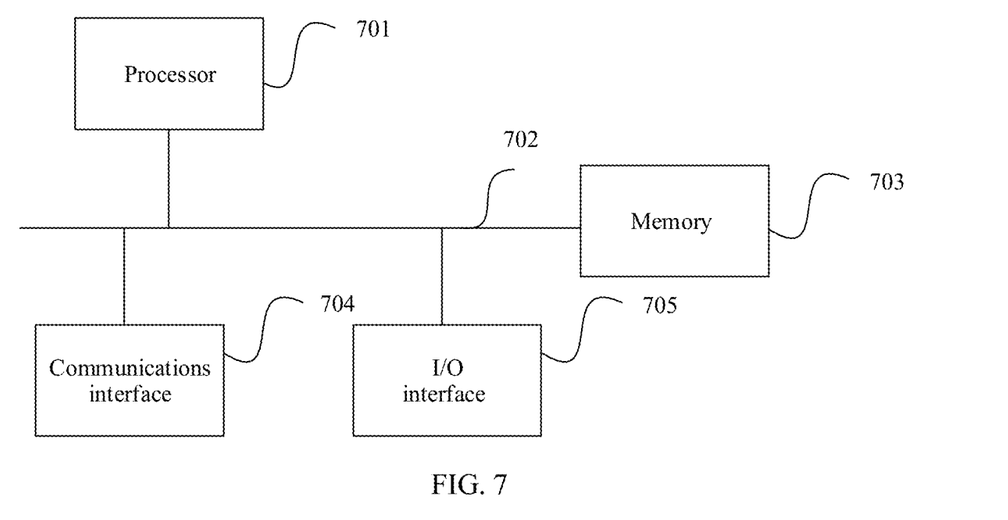
FIG. 7 is a schematic structural diagram of another terminal device according to an embodiment of the present invention.

The customized alerting tone server in the embodiments of the present invention may further be implemented in a manner of a computer device (or a system) in FIG. 5. FIG. 7 is a schematic diagram of a computer device according to an embodiment of the present invention. The computer device includes at least one processor 501, a communications bus 502, a memory 503, and at least one communications interface 504, and may further include an I/O interface 505.

The processor may be a universal central processing unit (CPU), a microprocessor, an application-specific integrated circuit (application-specific integrated circuit, ASIC), or one or more integrated circuits configured to control execution of programs in solutions of the present invention.

The communications bus may include a path for transmitting information between the foregoing components. The communications interface is configured to communicate with another device or a communications network, for example, Ethernet, a radio access network (RAN), or a wireless local area network (Wireless Local Area Network, WLAN) by using any apparatus such as a transceiver.

The memory may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory is not limited thereto. The memory may exist independently, and is connected to the processor through a bus. Alternatively, the memory may be integrated into the processor.

The memory is configured to store application program code used to execute the solutions of the present invention, and the execution is controlled by the processor. The processor is configured to execute the application program code stored in the memory.

During specific implementation, the processor may include one or more CPUs, and each CPU may be a single-core (single-core) processor or a multi-core (multi-Core) processor. The processor herein may be one or more devices, circuits, and/or processing cores configured to process data (for example, a computer program instruction).

During specific implementation, in an embodiment, the computer device may further include the input/output (I/O) interface. For example, an output device may be a liquid crystal display (liquid crystal display, LCD), a light emitting diode (light emitting diode, LED) display device, a cathode ray tube (cathode ray tube, CRT) display device, a projector (projector), or the like. An input device may be a mouse, a keyboard, a touchscreen device, a sensing device, or the like.

The computer device may be a general-purpose computer device or a special-purpose computer device. During specific implementation, the computer device may be a desktop computer, a portable computer, a network server, a palmtop computer (Personal Digital Assistant, PDA), a mobile phone, a tablet computer, a wireless terminal device, a communications device, an embedded device, or a device with a structure similar to that in FIG. 5. A type of the computer device is not limited in this embodiment of the present invention.

The customized alerting tone server in FIG. 1 may be the device shown in FIG. 5, and the memory stores one or more software modules. The customized alerting tone server may implement the software module by using the processor and the program code in the memory, to implement the foregoing methods.

An embodiment of the present invention further provides a computer storage medium, configured to store computer software instructions used by the device shown in FIG. 4 or FIG. 5. The computer storage medium includes a program designed to perform the foregoing method embodiments. The foregoing method can be implemented by executing the stored program.

Figure 6:
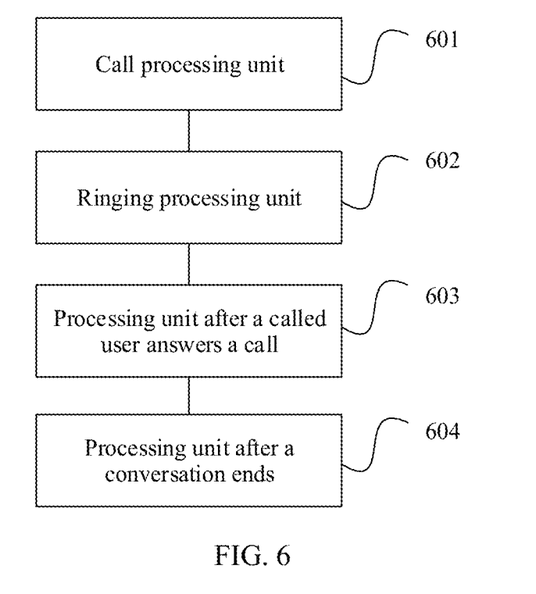
FIG. 6 is a schematic structural diagram of a terminal device according to an embodiment of the present invention.

An embodiment of the present invention further provides a schematic structural diagram of a terminal device, as shown in FIG. 6, including a call processing unit 601, a ringing processing unit 602, and a processing unit 603 after a called user answers a call.

The call processing unit is configured to send a call request.

The ringing processing unit is configured to receive a called terminal ringing message sent by a customized alerting tone server, and a customized alerting tone audio stream and a customized alerting tone video stream that are played by the customized alerting tone server.

The processing unit after a called user answers a call is configured to: receive a called terminal message indicating that a called user answers a call and sent by the customized alerting tone server, perform call media resource negotiation and customized alerting tone video resource negotiation with the customized alerting tone server, perform an audio call with a called terminal, and receive the customized alerting tone video stream played by the customized alerting tone server.

Further, the terminal device further includes a processing unit 604 after a conversation ends. The processing unit after a conversation ends is configured to: after the called terminal ends a conversation, perform customized alerting tone media resource negotiation with the customized alerting tone server, and continue receiving the customized alerting tone audio stream and the customized alerting tone video stream that are played by the customized alerting tone server.

These units implement related functions in the foregoing embodiment in FIG. 2A and FIG. 2B or FIG. 3A and FIG. 3B, and details are not described again.

In this embodiment, the terminal device is presented in a form of a function unit. The "unit" herein may be an application-specific integrated circuit (application-specific integrated circuit, ASIC), a circuit, a processor and a memory that execute one or more software or firmware programs, an integrated logic circuit, and/or another component that can provide the foregoing functions. In a simple embodiment, a person skilled in the art may figure out that the terminal device may be implemented by using a processor, a memory, and a communications interface.

The terminal device in the embodiments of the present invention may further be implemented in a manner of a computer device (or a system) in FIG. 7. FIG. 7 is a schematic diagram of a computer device according to an embodiment of the present invention. The computer device includes at least one processor 701, a communications bus 702, a memory 703, and at least one communications interface 704, and may further include an I/O interface 705.

The processor may be a universal central processing unit (CPU), a microprocessor, an application-specific integrated circuit (application-specific integrated circuit, ASIC), or one or more integrated circuits configured to control execution of programs in solutions of the present invention.

The communications bus may include a path for transmitting information between the foregoing components. The communications interface is configured to communicate with another device or a communications network, for example, Ethernet, a radio access network (RAN), or a wireless local area network (Wireless Local Area Network, WLAN) by using any apparatus such as a transceiver.

The memory may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory is not limited thereto. The memory may exist independently, and is connected to the processor through a bus. Alternatively, the memory may be integrated into the processor.

The memory is configured to store application program code used to execute the solutions of the present invention, and the execution is controlled by the processor. The processor is configured to execute the application program code stored in the memory.

During specific implementation, the processor may include one or more CPUs, and each CPU may be a single-core (single-core) processor or a multi-core (multi-Core) processor. The processor herein may be one or more devices, circuits, and/or processing cores configured to process data (for example, a computer program instruction).

During specific implementation, in an embodiment, the computer device may further include the input/output (I/O) interface. For example, an output device may be a liquid crystal display (liquid crystal display, LCD), a light emitting diode (light emitting diode, LED) display device, a cathode ray tube (cathode ray tube, CRT) display device, a projector (projector), or the like. An input device may be a mouse, a keyboard, a touchscreen device, a sensing device, or the like.

The computer device may be a general-purpose computer device or a special-purpose computer device. During specific implementation, the computer device may be a desktop computer, a portable computer, a network server, a palmtop computer (Personal Digital Assistant, PDA), a mobile phone, a tablet computer, a wireless terminal device, a communications device, an embedded device, or a device with a structure similar to that in FIG. 7. A type of the computer device is not limited in this embodiment of the present invention.

The terminal device in FIG. 1 may be the device shown in FIG. 7, and the memory stores one or more software modules. The terminal device may implement the software module by using the processor and the program code in the memory, to implement the foregoing methods.

An embodiment of the present invention further provides a computer storage medium, configured to store computer software instructions used by the device shown in FIG. 6 or FIG. 7. The computer storage medium includes a program designed to perform the foregoing method embodiments. The foregoing method can be implemented by executing the stored program.

Although the present invention is described with reference to the embodiments, in a process of implementing the present invention that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and embodiments thereof, it is clear that various modifications and combinations may be made thereto. Correspondingly, the specification and accompanying drawings are merely example description of the present invention defined by the appended claims, and is considered as any of or all modifications, variations, combinations or equivalents that cover the scope of the present invention. It is clear that a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A call processing method by a customized alerting tone server, comprising:
   receiving a call request sent by a calling terminal, and sending the call request to a called terminal;
   receiving a called terminal ringing message, and providing a customized alerting tone audio stream and a customized alerting tone video stream to the calling terminal;
   receiving a called terminal message indicating that a called user answers a call, and performing call media resource negotiation and customized alerting tone video resource negotiation with the calling terminal; and
   stop providing playing the customized alerting tone audio stream; and
   providing the customized alerting tone video stream to the calling terminal.

2. The method according to claim 1, further comprising:
   after receiving the called terminal message indicating that a called user answers a call, determining that a calling user or a called user has subscribed to a customized alerting tone continuous playing service, and then performing call media resource negotiation and customized alerting tone video resource negotiation with the calling terminal.

3. The method according to claim 1, wherein the performing call media resource negotiation and customized alerting tone video resource negotiation with the calling terminal comprises:
   sending a media negotiation message to the calling terminal, wherein the media negotiation message carries call media resource session description protocol SDP information of the called terminal, and further carries SDP information of the customized alerting tone video stream.

4. The method according to claim 1, wherein after receiving the called terminal message indicating that a called user answers a call, the playing the customized alerting tone video stream to the calling terminal comprises one of the following manners:
   continuing, by the customized alerting tone server, playing the customized alerting tone video stream that is played during ringing; or
   replaying from the beginning, by the customized alerting tone server, the customized alerting tone video stream that is played during ringing; or
   playing, by the customized alerting tone server, a customized alerting tone video stream that is different from the customized alerting tone video stream played during ringing.

5. The method according to claim 1, wherein the method further comprises:
   receiving a called terminal message indicating that a conversation ends and sent by the called terminal; and performing customized alerting tone media resource negotiation with the calling terminal, and continuing playing a customized alerting tone video stream to the calling terminal.

6. A call processing method, applied to a terminal device, and comprising:
sending a call request;
receiving a called terminal ringing message sent by a customized alerting tone server, and a customized alerting tone audio stream and a customized alerting tone video stream that are played by the customized alerting tone server;
receiving a called terminal message indicating that a called user answers a call and sent by the customized alerting tone server, and performing call media resource negotiation and customized alerting tone video resource negotiation with the customized alerting tone server; and
performing an audio call with a called terminal, and receiving the customized alerting tone video stream provided by the customized alerting tone server.

7. The method according to claim 6, wherein the performing call media resource negotiation and customized alerting tone video resource negotiation with the customized alerting tone server comprises:
receiving a media negotiation message sent by the customized alerting tone server, wherein the media negotiation message carries call media resource session description protocol, SDP, information of the called terminal, and further carries SDP information of the customized alerting tone video stream.

8. The method according to claim 6, wherein the method further comprises:
after the called terminal ends a conversation, performing customized alerting tone media resource negotiation with the customized alerting tone server, and continuing receiving the customized alerting tone audio stream and the customized alerting tone video stream that are played by the customized alerting tone server.

9. A customized alerting tone server, comprising:
at least one processor; and
a non-transitory computer-readable storage medium coupled to the at least one processor and storing one or more instructions, when executed by the at least one processor, cause the data transmission apparatus to perform operations comprising:
receiving a call request sent by a calling terminal, and sending the call request to a called terminal;
receiving a called terminal ringing message, and providing a customized alerting tone audio stream and a customized alerting tone video stream to the calling terminal;
receiving a called terminal message indicating that a called user answers a call, and performing call media resource negotiation and customized alerting tone video resource negotiation with the calling terminal; and
stop providing the customized alerting tone audio stream to the calling terminal, and providing the customized alerting tone video stream to the calling terminal.

10. The customized alerting tone server according to claim 9, wherein the operation further comprises:
after receiving the called terminal message indicating that a called user answers a call, determining that a calling user or a called user has subscribed to a customized alerting tone continuous playing service, and then performing call media resource negotiation and customized alerting tone video resource negotiation with the calling terminal.

11. The customized alerting tone server according to claim 9, wherein the performing call media resource negotiation and customized alerting tone video resource negotiation with the calling terminal comprises:
sending a media negotiation message to the calling terminal, wherein the media negotiation message carries call media resource session description protocol SDP information of the called terminal, and further carries SDP information of the customized alerting tone video stream.

12. The customized alerting tone server according to claim 9, wherein after receiving the called terminal message indicating that a called user answers a call, the playing the customized alerting tone video stream to the calling terminal comprises one of the following manners:
continuing playing the customized alerting tone video stream that is played during ringing; or
replaying from the beginning, the customized alerting tone video stream that is played during ringing; or
playing a customized alerting tone video stream that is different from the customized alerting tone video stream played during ringing.

13. The customized alerting tone server according to claim 9, wherein the operation further comprises:
receiving a called terminal message indicating that a conversation ends and sent by the called terminal; and
performing customized alerting tone media resource negotiation with the calling terminal, and continuing playing a customized alerting tone video stream to the calling terminal.

14. A terminal device, comprising:
at least one processor; and
a non-transitory computer-readable storage medium coupled to the at least one processor and storing one or more instructions, when executed by the at least one processor, cause the data transmission apparatus to perform operations comprising:
sending a call request;
receiving a called terminal ringing message sent by a customized alerting tone server, and a customized alerting tone audio stream and a customized alerting tone video stream that are played by the customized alerting tone server;
receiving a called terminal message indicating that a called user answers a call and sent by the customized alerting tone server, and performing call media resource negotiation and customized alerting tone video resource negotiation with the customized alerting tone server; and
performing an audio call with a called terminal, and receiving the customized alerting tone video stream provided by the customized alerting tone server.

15. The terminal device according to claim 14, wherein the performing call media resource negotiation and customized alerting tone video resource negotiation with the customized alerting tone server comprises:
receiving a media negotiation message sent by the customized alerting tone server, wherein the media negotiation message carries call media resource session description protocol, SDP, information of the called terminal, and further carries SDP information of the customized alerting tone video stream.

16. The terminal device according to claim 14, wherein the method further comprises:

after the called terminal ends a conversation, performing customized alerting tone media resource negotiation with the customized alerting tone server, and continuing receiving the customized alerting tone audio stream and the customized alerting tone video stream that are played by the customized alerting tone server.

* * * * *